Jan. 15, 1929.
L. J. MOWRY
AWNING BRACKET
Filed Aug. 23, 1926
1,699,246
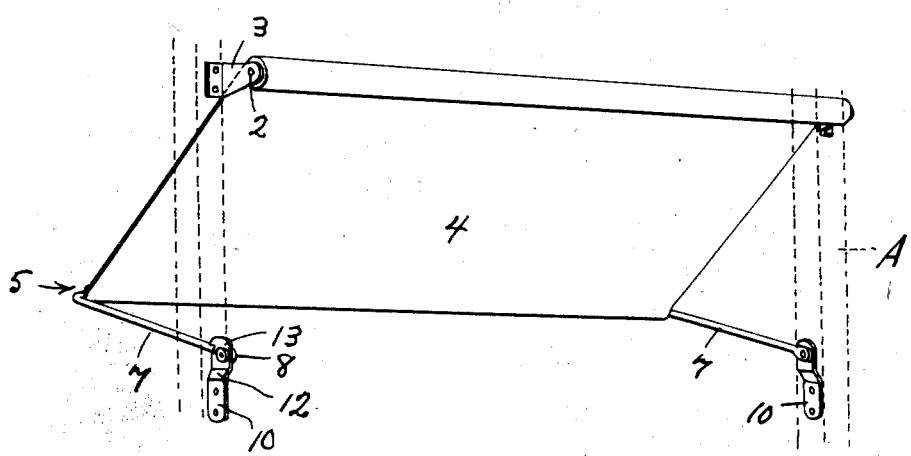
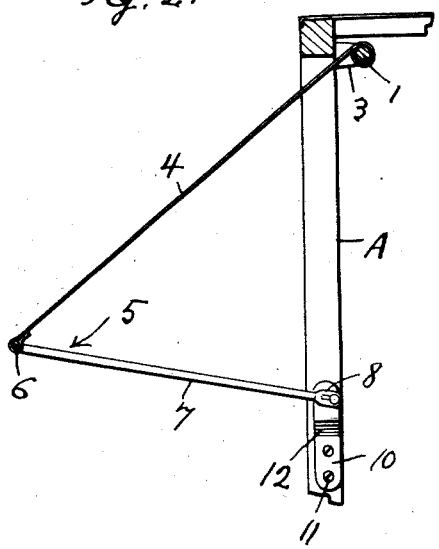
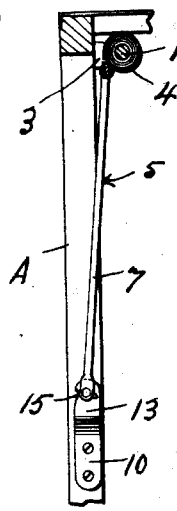
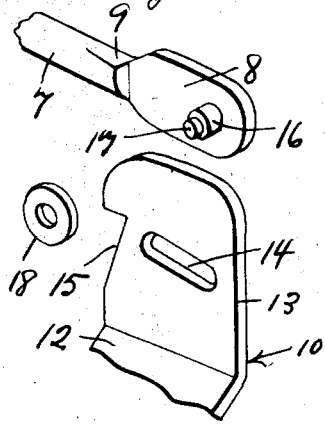
Inventor
Lorenz J. Mowry
By Clarence A. O'Brien
Attorney Patented Jan. 15, 1929.

1,699,246

UNITED STATES PATENT OFFICE.

LORENZ J. MOWRY, OF ELYRIA, OHIO, ASSIGNOR OF ONE-HALF TO G. I. STINE, OF FREMONT, OHIO.

AWNING BRACKET.

Application filed August 23, 1926. Serial No. 130,956.

The present invention relates to improvements in awning brackets and has reference more particularly to a connection between a rolling shade or curtain and the window frame of the doors of an automobile of the closed body type.

One of the important objects of the present invention is to provide an awning bracket wherein the same includes a bracket attached to the window frame of the car and an arm carried by the awning or curtain, said arm being slidably and swingably connected to the bracket whereby the curtain may be moved to a raised inoperative position or lowered operative position for preventing the sun rays as well as rain or snow entering the sides of the automobile.

A still further object is to provide an awning bracket of the above mentioned character which is simple in construction, inexpensive, strong and durable and further well adapted to the purpose for which it is designed.

Other objects and advantages of this invention will become apparent during the course of the following description.

In the accompanying drawing forming part of this specification and in which like numerals indicate like parts:

Figure 1 is a perspective view of my improved automobile curtain showing the same in an operative position.

Figure 2 is a fragmentary vertical sectional view through the window frame of a door showing the position of the parts of my invention wherein the curtain or awning is in use.

Figure 3 is a similar view showing the device in an inoperative position, and

Figure 4 is a perspective view of the inner end of one of the arms of the U-shaped frame, a portion of the supporting bracket therefor, and a washer, the parts being shown in disassembled relation.

In the drawing wherein for the purpose of illustration is shown the preferred embodiment of my invention, the numeral 1 designates a spring roller of the type conventionally used in connection with window shade curtains. The roller extends transversely across the top of the window frame of the door of a motor vehicle of the closed body type and the ends of the roller are provided with the usual pintles which are journaled for rotation in suitable brackets 3. The roller is supported on the inside of the top of the window frame A of the car door. The curtain or awning 4 is secured at one end on the roller and is adapted to be wound therearound by the action of the spring in the roller (not shown) in the manner well known in the art.

The awning is of such width as to be adapted to extend through the opening formed in the window frame A for the usual sliding glass window and is readily obvious from the construction shown in the drawing.

Also forming a part of the present invention is the substantially U-shaped frame formed from a metallic rod and this frame is designated generally by the numeral 5. The free end of the curtain 4 is secured around the crown portion 6 of the U-shaped frame 5. The inwardly extending arms 7 of the U-shaped frame 5 are flattened as illustrated at 8 and the outer face of each of the flattened portions 8 lies in substantially the same plane with the outer side of each arm so that a shoulder 9 is formed at the juncture of the end of each arm and the inner face of each of the flattened portions 8. The purpose of this construction will be hereinafter more fully described.

A pair of brackets 10 are secured on the inner opposed sides of the window frame A of the vehicle car door at a point below the roller 1. Each of these brackets comprises an elongated strip of metal which is secured at its lower portion to the side of the frame A by any appropriate fastening means such as is shown at 11. The intermediate portion of this strip is bent outwardly and slightly upwardly as at 12 so that the upper portion 13 of the strip is spaced from the side of the frame as is clearly shown in Figure 1.

An angularly disposed slot 14 is arranged transversely in the upper portion 13 of each strip forming the brackets 10. A notch 15 is formed in the outer side edge of the upper portion 13 and this notch 15 is adapted for cooperation with the respective shoulders 9 formed on the inner end portions of the arms 7 of the U-shaped frame 5 as will be presently apparent. A pivot forming pin 16 extends inwardly from each of the flattened portions 8. A reduced extension 17 is formed on each of the inwardly extending pivot forming pins 16, as is clearly shown in Figure 4. The pins and the extensions 17 formed thereon are disposed within the respective angularly arranged slots 14. A washer shown at 18 is placed over the reduced end 17 of each of the pins 16 and is adapted to be disposed adjacent the outer face of the upper portions of the respective brackets, the reduced ends 17 are then upset or otherwise flattened so that a pivotal connection between the inner ends of the arms 7 of the U-shaped frame 5 and the brackets 10 is provided.

The pivot forming pins 16 will be also adapted to slide within the respective slots 14 for a purpose to be presently described.

Normally, the parts are arranged as shown in Figure 3 of the drawing. The spring roller 1 will normally hold the curtain or awning 4 wound therearound and the arms 7 of the U-shaped frame 5 will be disposed in a vertical position on the inside of the window. The pivot forming pins 16 will be disposed in the outermost ends of the respective slots 14. In this manner, the curtain or awning will be maintained in an inoperative position out of the way, and the same will not affect the operation of the sliding window.

When it is desired to swing the curtain or awning to an operative position, it is only necessary to push outwardly on the frame 5, thus causing the curtain to be unrolled from the roller 1, and furthermore causing the arms 7 to be swung outwardly of the window after the glass panel has been lowered, and after the curtain has been unrolled, the frame is then moved inwardly so that the pins 16 will travel inwardly toward the inner end of the respective slots 14, thereby causing the shoulders 9 to be brought into locking engagement with the respective notches 15. When in this position, the coacting shoulders and notches will hold the frame in a substantially horizontally disposed position and maintain the curtain or awning in the lowered operative position as is clearly shown in Figures 1 and 2.

In order to again return the curtain to its inoperative position, it is only necessary to disengage the shoulders from the notches by moving outwardly on the frame and instantaneously the spring will rewind the curtain on its roller and also swing the arms upwardly to the position shown in Figure 3.

It will thus be seen from the foregoing description that I have provided a highly novel and simple curtain or awning attachment for the sides of an automobile body of the closed type which will protect the occupants of the vehicle from the sun rays, as well as from rain or snow when the windows are lowered.

The simplicity of my devices enables the same to be readily and easily attached on the window frames of the car doors and furthermore may be readily and easily actuated.

While I have shown the preferred embodiment of my invention, it is to be understood that minor changes in the size, shape and arrangement of parts may be resorted to without departing from the spirit or sacrificing any of the advantages of the appended claim.

Having thus described the invention, what I claim is:

In combination, a bracket comprising a flat strip of metal secured at its lower end portion to a support, the intermediate portion of the strip being bent outwardly so as to space the upper end portion of the strip from the support, the upper portion of the strip having an angularly disposed slot formed therein, the outer side edge of the strip having a notch formed in the upper end portion thereof, an arm, one end of the arm being flattened, a shoulder formed at the juncture of the end of the arm and the flattened portion, a pivot forming pin carried by the flattened end portion and adapted for slidable movement within the angularly disposed slot, whereby said arm is adapted for slidable and swinging movement with respect to the bracket, said aforementioned shoulder cooperating with the notch for holding the arm in a lowered position.

In testimony whereof I affix my signature.

LORENZ J. MOWRY.